INVENTOR
BERTRAM A. TREVOR.
BY
H. S. Grover
ATTORNEY

March 27, 1951 B. A. TREVOR 2,546,935

HIGH FIDELITY PULSE MULTIPLEX SYSTEM

Filed Sept. 28, 1945 2 Sheets-Sheet 2

INVENTOR
BERTRAM A. TREVOR
BY H. S. Grover
ATTORNEY

Patented Mar. 27, 1951

2,546,935

UNITED STATES PATENT OFFICE 2,546,935

HIGH FIDELITY PULSE MULTIPLEX SYSTEM

Bertram A. Trevor, Riverhead, N. Y., assignor to Radio Corporation of America, a corporation of Delaware Application September 28, 1945, Serial No. 619,235

3 Claims. (Cl. 179—15)

Figures 1, 1A:
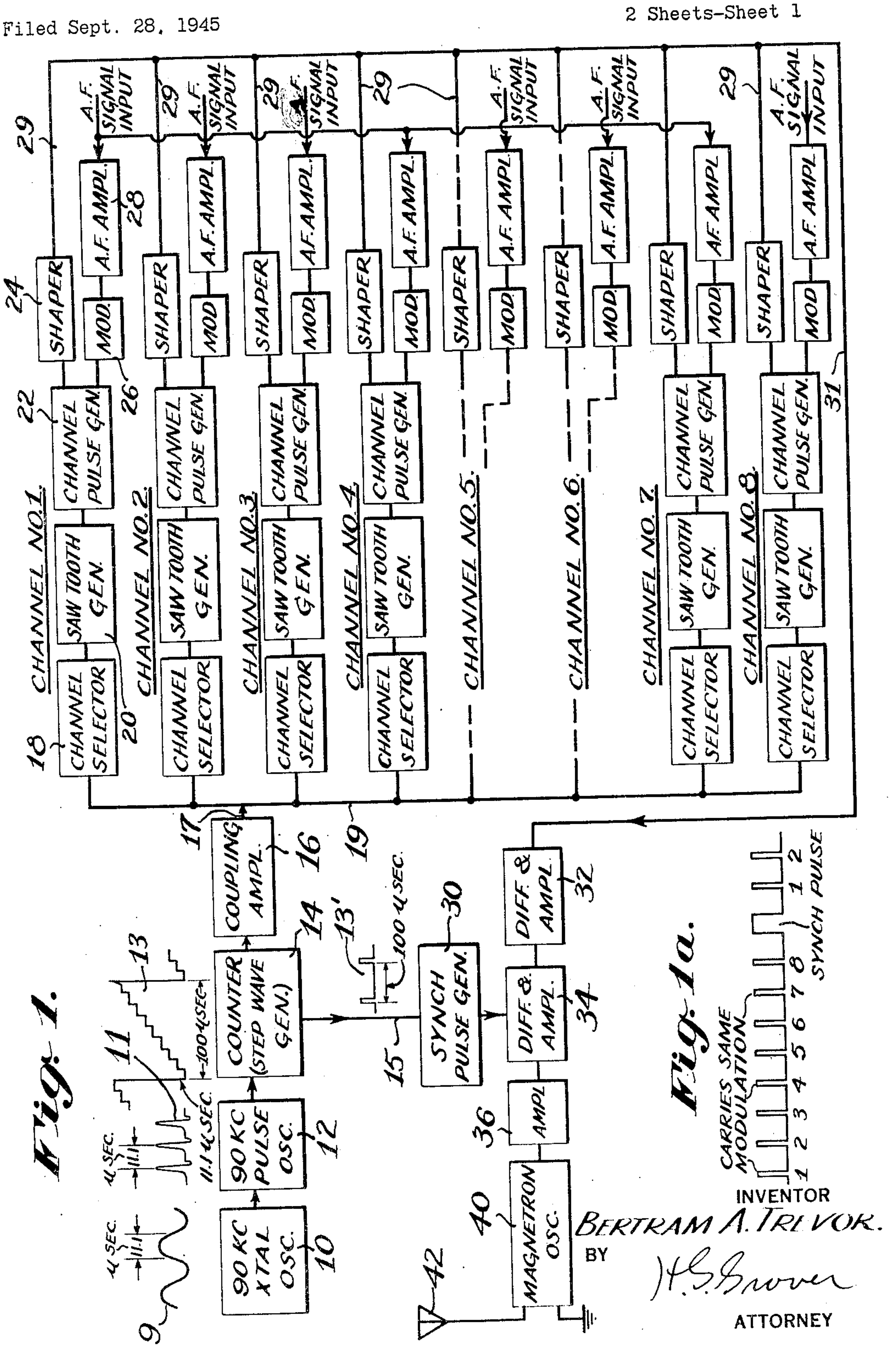

This invention relates to multiplex communication systems, and particularly to such systems utilizing pulses of electrical energy for communication purposes.

It is known in multiplex systems to employ pulses of radio frequency energy which are short compared to the time intervals between them, and wherein the pulse outputs from the different channels are independently modulated for the transmission of independent programs or modulations. The different channels thus carry different messages, and these messages may be speech or telegraph signals. The modulation may be effected by modulating the amplitude, width (duration) or timing of the pulses. Such systems are sometimes referred to as time division multiplex systems because the common transmitting circuit (any suitable transmission medium) is assigned consecutively to successive channels for equal time intervals.

The pulses in the common transmitting circuit may or may not be short compared to the time intervals between them. It is preferred, though not essential, that the pulses from all the channels occupy only a small percentage of the total time for all conditions of modulation, in order that the common transmitter can furnish a peak power which considerably exceeds the power obtainable in a continuous wave system.

In such systems, the pulse repetition rate may, for example, be 10,000 per second (10 kc.) for each channel. Where an eight channel pulse multiplex system is employed utilizing a synchronizing pulse for each synchronizing period, the over-all pulse rate from the system may be 90,000 per second (90 kc.). This number is obtained by assigning 10,000 pulses per second for each of the eight ordinary fidelity channels and an additional 10,000 pulses per second for synchronization purposes.

Ordinarily, the pulse rate is about three times the highest modulation frequency. Although a pulse repetition of 10 kc. for each channel is sufficient to satisfactorily transmit signals having an audio frequency of 3000 cycles and less, it will be evident that such a repetition rate is not satisfactory for transmitting speech waves having higher audio frequencies, for example 5,000 to 9,000 cycles.

An object of the present invention is to provide a pulse multiplex system having one or more high fidelity channels along with a number of ordinary fidelity channels.

Another object is to provide a multi-channel radio system having at least one high telephone quality audio frequency circuit and one or more lower telephone quality audio frequency circuits.

These objects of the invention are achieved by combining two or more channels in the multiplex system so as to raise the effective pulse repetition rate and thereby permit higher audio frequencies to be carried with greater fidelity by the combined channels. As an illustration, assuming an eight channel pulse multiplex system with a pulse repetition rate of 10 kc. per channel, I contemplate combining the inputs of channels 1, 4 and 7 at the transmitting terminal and supplying high quality audio frequency up to 9 kc. to all three combined channels simultaneously. In this way, an effective pulse frequency of 30 kc. is available from the combined channels for carrying the modulation. In this particular illustration, the receiving multiplex channels 1, 4 and 7 (at the receiving terminal) are also combined and a suitable single 9 kc. filter utilized.

In this illustration of an embodiment of the invention, it is assumed that channels (channel circuits) 1, 4 and 7 of an eight channel multiplex system are combined to provide a single high fidelity channel. The modulation frequency band passed by this high fidelity channel is 9 kc. In such a system, channels (channel circuits) 2, 3, 5, 6 and 8 each provide ordinary fidelity channels and pass a 3 kc. modulation frequency band. Obviously, other combinations of channels can be used to achieve a high fidelity channel, such as combining channels 2, 5 and 8. The channel numbers selected for combination are preferably such that the pulses from these respective channels are evenly spaced apart in time.

If only two channels of a multiplex system are to be combined in accordance with the invention, it is then desirable to employ a multiplex system containing an odd number of channels so that there are an even number of time periods including the synchronizing signal. As an example, if the multiplex system is designed to be a seven channel system utilizing a synchronizing pulse for each cycle of operation or synchronization period, then channels 1 and 5 can be combined to provide a high fidelity channel furnishing evenly spaced pulses at twice normal repetition rate (at twice the pulse repetition rate of any of the other channels).

The invention is particularly useful in a radio multiplex system or in a radio relay system in which it is desired to transmit and receive high quality speech or audio signals along with ordinary quality speech or audio signals.

The invention will now be described in more detail in connection with a particular type of eight channel pulse multiplex radio system which has been developed and successfully tried out by the Radio Corporation of America. It should be distinctly understood, however, that the principles of the invention are applicable to various types of multiplex or time division systems having different numbers of channels, and that the invention is not limited to the particular system described hereinafter which is given as an example only.

Figure 2:
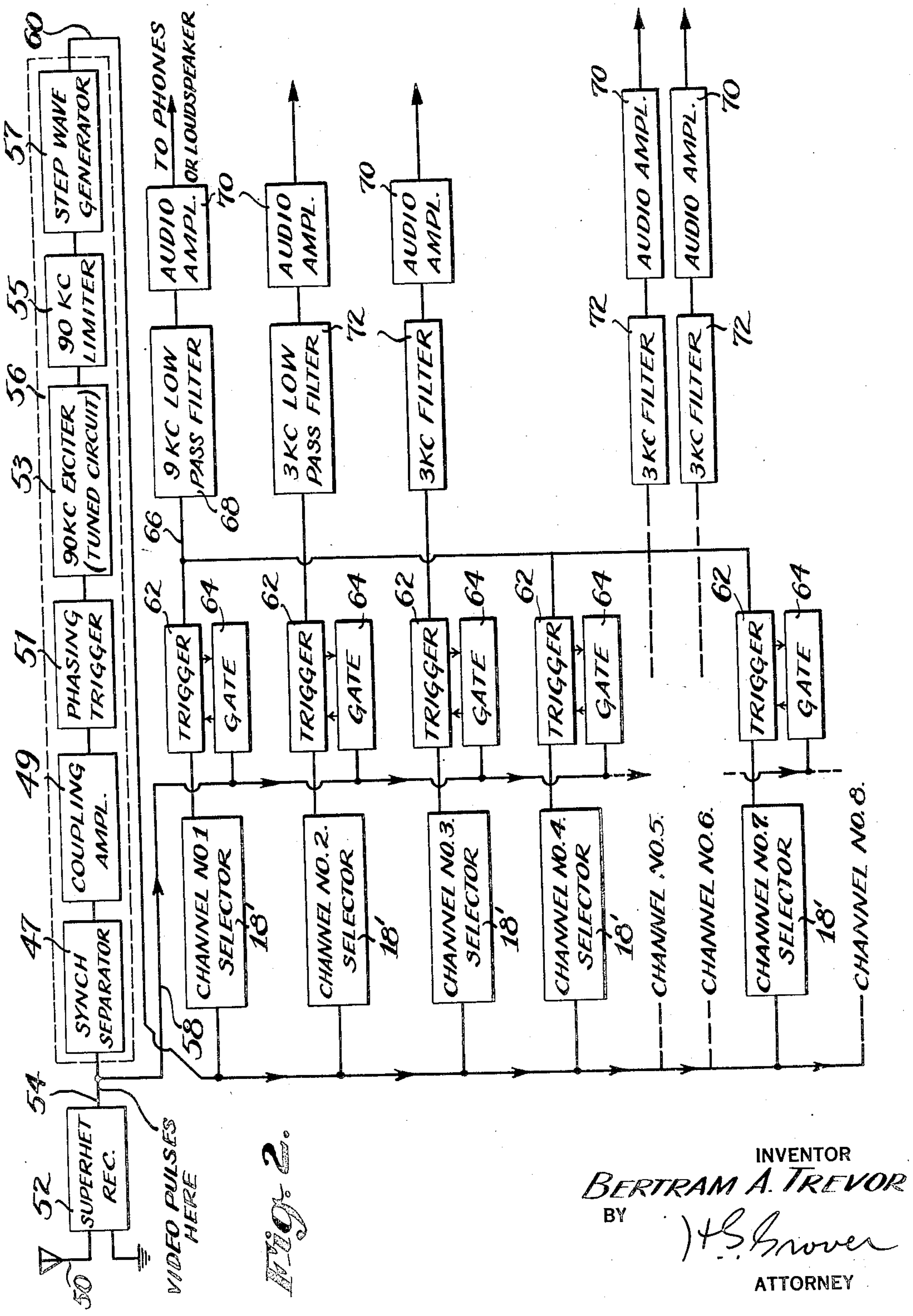

In the drawing:

Figs. 1, 1*a* and 2 illustrate, diagrammatically, the transmitting and receiving ends, respectively, of a complete pulse multiplex radio system in accordance with the invention.

The transmitter of Fig. 1 is, in effect, a modification of the pulse multiplex system disclosed in copending application Serial No. 608,957, filed by William D. Houghton on August 4, 1945, now U. S. Patent 2,531,817, granted Nov. 28, 1950, to which reference is herein made for the electrical circuits of the apparatus in the various boxes. Essentially, this modification comprises combining three channels to obtain a single high fidelity channel. The other five channels are ordinary fidelity channels.

The transmitter of Fig. 1 will first be described as having eight individual channels, and later an explanation will be given on how three of these channels are combined into a single high fidelity channel. This transmitter utilizes short pulses of radio frequency energy which are time displaced by modulation. For multiplexing purposes, the pulses corresponding to the separate eight channels are separately and consecutively generated at a fixed repetition rate which will be called hereinafter the synchronization rate, corresponding to a fixed time interval to be called the synchronization period. In this transmitting system, the synchronization rate is 10 kc. and the corresponding period 100 $\mu$sec. (microseconds). A pulse occurs once each synchronization period for each of the eight channels. The individual rates and periods are consecutively the same and equal to the synchronization rate and period. Each channel pulse occurs at a rate of 10 kc. and the separation between adjacent pulses in each channel for an unmodulated condition is 100 $\mu$sec., or microseconds. Because the unmodulated signal pulses are similarly located in each channel, they are, therefore, about 11 microseconds apart in the common output circuit. The pulses in each channel can be modulated $\pm 4$ $\mu$sec. (peak modulation), thus leaving a guard space between pulses from succeeding channels of about 3.1 $\mu$sec. The guard space is necessary to reduce cross modulation effects. The pulses from other channels occur in the interval between adjacent pulses from any one channel. The synchronization pulses occupy the ninth interval of 11.1 microseconds. The output pulses from the channel are of constant length and the time between two adjacent pulses is measured from the leading edges. The pulses from the channels are equally spaced in the absence of modulation.

In Fig. 1 there is shown a 90 kc. crystal oscillator 10 producing pulses of current which feed into and lock by injection a 90 kc. short pulse oscillator 12. The short output pulses from the pulse oscillator 12 are applied to a counter or step-wave generator 14. The voltage wave forms from the apparatus 10, 12 and 14 are illustrated by the curves 9, 11 and 13, respectively, appearing immediately above the equipment.

The counter 14 provides two outputs, one of which is the step wave 13 which is supplied to the coupling amplifier 16 and the other of which is a synchronization pulse 13′ occurring once for each step wave cycle and which is applied via lead 15 to a synchronization pulse generator 30. The function of the step wave 13, which is applied to the coupling amplifier and then to the different channels over lead 17, is to time the mean occurrence of each channel pulse. The output of the coupling amplifier 16 is applied to a connection 19 which is common to all the channels 1 to 8, inclusive.

All channels are substantially identical; and each includes in the order named, a channel selector 18, normally non-conductive saw-tooth generator 20 controlled by the output of the channel selector 18, a pulse generator 22, and an output circuit including a shaper or clipper-limiter 24. The pulses produced by the channel pulse generator 22 are modulated as to time or phase by means of a modulator 26 which is supplied with suitable signals, such as speech, from an audio amplifier 28. All channels have their channel selector inputs connected together in electrically parallel relation.

The channel selectors are differently self-biased and each channel selector is normally biased well beyond the current cut-off condition. The bias of each channel selector is so adjusted that the applied step wave from the coupling amplifier 16 causes current to flow consecutively in the different channel selectors. One channel selector conducts for each rise of voltage in the step wave 13 up to eight, which is the number of channels. Each step rise in the step wave is great enough to insure that during its occurrence the current of the correspondingly biased channel selector shall be driven rapidly from beyond the cut-off condition to a zero bias value. Once a channel selector starts to conduct, the current flow therein will continue until the end of the synchronization period, when the input voltage to the selector drops to zero at the end of the step. The outputs from all channels appearing in leads 29 flow in a common lead 31 to differentiator and clipper circuits 32 and 34 from which pulses of shorter duration are applied to a power amplifier 36 whose output controls the production of radio frequency pulses from a magnetron oscillator 40. The very short duration output pulses from magnetron 40 which may each have an effective duration of 0.3 $\mu$sec., are fed to antenna 42, from which they are radiated to the remotely located receiving terminal shown in Fig. 2.

The synchronization pulse generator 30 which receives a pulse over lead 15 from the counter 14 at the end of each step wave, produces a pulse at the end of each step wave which is supplied to the differentiator and clipper 34 and also fed to the amplifier 36 and magnetron 40 together with the channel pulses. There will thus be eight consecutively appearing pulses from the eight different channels followed by a synchronization pulse for each cycle of operations. For the unmodulated condition, all of these channel pulses and the synchronization pulse will be separated from one another by a spacing equivalent to 11.1 $\mu$sec. It will thus be seen that the synchronization period of 100 $\mu$sec. is divided into nine equal intervals by the step counter of step wave generator 14, and that all of these pulses are similarly located in each one of these nine equal intervals and similarly spaced apart for the unmodulated signal condition.

In order to provide a single high fidelity channel capable of carrying higher telephone quality audio frequencies than the other channels, the inputs of audio frequency amplifiers 28 in channels 1, 4 and 7 are combined and fed with the same high quality audio signal. This signal can be speech or other suitable signals ranging up to 9 kc. The other channels, namely 2, 3, 5, 6 and 8, are individually modulated by separate audio signals ranging in frequency up to about 3 kc. It will thus be seen that the effective pulse repetition rate of the three combined channels forming a single high fidelity channel is 30 kc., while the pulse rate for each of the other channels carrying different modulation is 10 kc.

Fig. 1*a* graphically illustrates the approximate appearance of the envelope of the time displaced pulses in the common output of magnetron oscillator 40, as impressed on transmitting antenna 42, for the unmodulated condition. In Fig. 1*a* there are eight short channel pulses and one longer synchronizing pulse for each synchronizing period. This is because the pulse produced by the synchronizing pulse generator 30 is of longer duration than the individual channel pulses and periodically occurs after every eighth channel pulse. Fig. 1*a* also shows the appearance of the pulses in the output of amplifier 36. Amplifier 36 supplies direct current pulses to the cathode of the magnetron 40 and causes the magnetron to produce radio frequency pulses of a duration somewhat less than the duration of the pulse applied to the magnetron. The radio frequency pulses from the magnetron 40 may have a frequency of 1350 to 1450 megacycles, by way of example, and have a duration of about .4 $\mu$sec. for the channel pulses and 2.0 $\mu$sec. for the synchronizing pulse.

Because the signal inputs of channels 1, 4 and 7 are combined, as shown in Fig. 1, the same modulation will appear on the pulses designated 1, 4 and 7 of Fig. 1*a*, whereas independent modulations will appear on pulses 2, 3, 5, 6 and 8 representing the other channels. It should be noted that the pulses of combined channels 1, 4 and 7 representing the single high fidelity channel are spaced apart by two other pulses. Thus, the pulse in channel 1 is spaced apart from the pulse in channel 4 by the two pulses of channels 2 and 3, and similarly the pulse in channel 4 is spaced apart by the pulse in channel 7 from the two pulses of channels 5 and 6. Also, the pulse in channel 7 is spaced apart from the pulse in channel 1 of the next synchronizing period by the channel pulse of channel 8 and also by the synchronizing pulse.

Fig. 2 illustrates the receiving terminal of the pulse multiplex system for receiving the pulses sent out by the transmitter of Fig. 1 and for reproducing the original modulations. In Fig. 2, the pulse outputs of the three channels 1, 4 and 7 are combined and fed to a single 9 kc. low pass filter, whereas the pulse outputs of the other channels 2, 3, 5, 6 and 8 are individually fed to separate 3 kc. low pass filters for reproducing the individual audio signals.

Fig. 2 includes an antenna 50 for receiving the radio signals from the remotely located transmitter of Fig. 1, and a superheterodyne receiver 52 upon which the incoming pulses of radio frequency energy are impressed from the antenna. The output of the receiver 52 at lead 54 is in the form of spaced video (direct current) pulses. These video pulses then follow two paths, one path extending to apparatus 56 shown as a box in dash lines, and the other path indicated as lead 58 extending to the gates of all the channels.

Apparatus 56 separates the synchronization pulses from the channel pulses in the output of the superheterodyne receiver 52 and produces from these separated synchronization pulses a new step wave available at lead 60 whose amplitude is adjustable and whose phase is adjustable relative to the incoming pulses. This new step wave produced by apparatus 56 is similar to the step wave (note graph 13, Fig. 1) at the transmitter of Fig. 1 but is independent of the modulations in the channels. Each rise in this new step wave has a different amplitude and controls a different channel selector in the channels of Fig. 2 in substantially the same manner as described above in connection with Fig. 1.

Apparatus 56 includes a synchronizing pulse separator 47 which distinguishes between the longer duration synchronizing pulses and the shorter channel pulses. Putting it in other words, separator circuit 47 can be called a pulse selective system which enables the utilization of only the synchronization pulses. The output of separator circuit 47 is a single pulse for each synchronization period (100 microseconds). One suitable circuit which can be used for separator 47 is shown in Fig. 2*a* of copending application Serial No. 615,352, filed by William D. Houghton on September 10, 1945, now Patent No. 2,532,843, granted December 5, 1950, to which reference is made.

The output of synchronization pulse separator 47 is passed through a coupling amplifier 49 and then to a phasing trigger 51 which produces pulses of adjustable phase at the rate of one pulse for each 100 microseconds. The output of phasing trigger 51 is used to excite a 90 kc. exciter 53 which may be in the form of a tuned circuit. In effect, exciter 53 is a harmonic generator which produces a sine wave output of 90 kc. frequency. This 90 kc. sine wave output from box 53 is fed into a 90 kc. limiter 55 which produces a pulse for each peak of sine wave impressed thereon. Thus, the output from limiter 55 comprises 90 kc. pulses. These 90 kc. pulses from limiter 55 are fed to a step wave generator or pulse counter 57 which in turn produces a step wave voltage having nine steps or risers. Such a pulse counter may be similar to the one used at the transmitter and described in more detail in copending application Serial No. 608,957, supra.

The step wave voltage in lead 60 (output from apparatus 56) is fed to the inputs of the different channel selectors 18′. Each channel selector 18′ is normally non-conductive and passes current at a particular rise or amplitude in the step wave voltage, dependent upon previous adjustments. The different channel selectors 18′, like those in the transmitter of Fig. 1, are biased differently, and the bias is so adjusted that the applied step wave in lead 60 causes current to flow consecutively in the different channel selectors. One channel selector 18′ conducts for each rise of voltage in the step wave up to eight, and each rise or step of voltage is great enough to insure that during its occurrence the current of the correspondingly biased channel selector shall be driven rapidly from beyond the cut-off condition to a zero bias value.

The passing of current by a channel selector 18′ causes the tripping of its associated trigger circuit 62. Trigger circuit 62 is a flip-flop or unbalanced circuit having one degree of electrical stability. Such trigger circuits are known in the art and may consist of a pair of vacuum tube electrode structures whose grids and anodes are interconnected regeneratively. The trigger circuit has a stable state and an active state. A tripping pulse of suitable polarity serves to trigger off or trip the trigger circuit from its stable to its active state. In the stable state, one electrode structure passes current and the other electrode structure is non-conductive. These current passing conditions of the two electrode structures are reversed in the active state.

After the trigger circuit is tripped into the active state, it is restored to its normal or stable state by the gate 64 which is responsive to the video pulse in lead 58 which immediately follows in time the riser at which the channel selector started to conduct. Although the trigger circuit is self-restoring in character, it is given such a time constant that once tripped into the active state, it remains in this active state for a time interval sufficiently long to extend beyond the time in which its channel pulse is expected to arrive. The video pulses in lead 58 are impressed on gates 64 in the different channels, and these gates control the trigger circuits in response to the proper channel pulses. It should be understood that the leading edge of the channel pulse is used to control the trigger circuit 62, whereas the trailing edge of the synchronizing pulse is used in the apparatus 56. The modulation could be taken from either the leading or trailing edges. The output of each trigger circuit 62 is a variable width constant amplitude pulse whose time duration depends upon the time of arrival of the channel pulse. Thus, it will be seen that the time displaced incoming (received) pulses of constant duration have been converted into variable width pulses whose duration (width) corresponds with the time displacement of the incoming pulses. Stated in other words, the incoming pulses of variable occurrence time have been changed to pulses of variable width having the same modulation.

The outputs of the triggers 62 of channels 1, 4 and 7 are combined and fed via lead 66 to the 9 kc. low pass filter 68. There is thus passed to filter 68 pulses at an effective 30 kc. rate from three combined channels upon which the same audio frequency signal is impressed. Output from filter 68 is fed to an audio amplifier 70 and then to a suitable transducer such as phones or a loudspeaker.

The outputs of the triggers 62 of channels 2, 3, 5, 6 and 8 are individually fed to separate 3 kc. low pass filters 72 and then to individual audio amplifiers and transducers for reproducing independent signals.

From the foregoing, it will be seen that I am able to obtain a high fidelity channel from a conventional or known type of pulse multiplex system without making any major changes in the equipment. By combining other channels, it is possible to obtain two or more high fidelity channels along with a number of ordinary fidelity channels.

What is claimed is:

1. In a pulse multiplex system having a multiplicity of independent channels, a transmitter having means for producing pulses and modulating a characteristic thereof in each of said channels, the pulses in the different channels having the same repetition rate, and means for supplying the same modulation to a plurality of said channels and different modulations to other channels, to thereby effectively increase the effective pulse frequency available to carry the modulation supplied to said plurality of channels, means combining the outputs from all of said channels, means for causing said plurality of channels to produce pulses at such selected time intervals that the resulting combination of pulses from said plurality of channels is a series of regularly recurring pulses spaced evenly in time with pulses from the other channels occurring in the intervals between adjacent pulses in said series, a receiver having the same number of channels as said transmitter, means at said receiver for combining the pulse outputs from a plurality of channels corresponding in number and position to said plurality at said transmitter, a filter at the receiver for passing the combined outputs from said plurality, and other filters at the receiver of narrower frequency bands than said first filter for passing the pulse outputs of the other channels.

2. In a pulse multiplex system having a multiplicity of independent channels, a transmitter having means for producing pulses and modulating the timing thereof in each of said channels, the pulses in the different channels having the same repetition rate, and means for supplying the same modulation to a plurality of said channels in the same phase and different modulations to other channels, to thereby effectively increase the effective pulse frequency available to carry the modulation supplied to channels, said plurality of means combining the outputs from all of said channels, means for causing said plurality of channels to produce pulses at such selected time intervals that the resulting combination of pulses from said plurality of channels is a series of regularly recurring pulses spaced evenly in time with pulses from the other channels occurring in the intervals between adjacent pulses in said series, a receiver having the same number of channels as said transmitter, means at said receiver for combining the pulse outputs from a plurality of channels corresponding in number and position to said plurality at said transmitter, a filter at the receiver for passing the combined outputs from said plurality, and other filters at the receiver of narrower frequency bands than said first filter for passing the pulse outputs of the other channels.

3. A multiplex transmitting system having a plurality of channel circuits, a common transmission medium, means for assigning said medium consecutively to successive channel circuits for equal time intervals, means in each of said channel circuits for producing pulses, means for supplying the same modulation to at least two of said channel circuits which are non-adjacent in point of time and produce pulses spaced from each other and recurring regularly in time sequence, and means for supplying a different modulation to another channel circuit which is positioned between said first two channel circuits in point of time and produces pulses in the intervals between the pulses produced by said first two channel circuits.

BERTRAM A. TREVOR.

(References on following page)

REFERENCES CITED

The following references are of record in the file of this patent:

UNITED STATES PATENTS

| Number | Name | Date |
|---|---|---|
| 2,199,634 | Koch | May 7, 1940 |
| 2,277,192 | Wilson | Mar. 24, 1942 |
| 2,405,252 | Goldsmith | Aug. 6, 1946 |
| 2,406,165 | Schroeder | Aug. 20, 1946 |
| 2,413,410 | Farrington | Dec. 31, 1946 |
| 2,495,739 | Labin | Jan. 31, 1950 |

FOREIGN PATENTS

| Number | Country | Date |
|---|---|---|
| 555,993 | Great Britain | Mar. 12, 1942 |